Sept. 15, 1964 G. A. HAGELTHORN Re. 25,642
HOSE AND CONDUIT SYSTEM
Original Filed Feb. 17, 1959 2 Sheets-Sheet 1
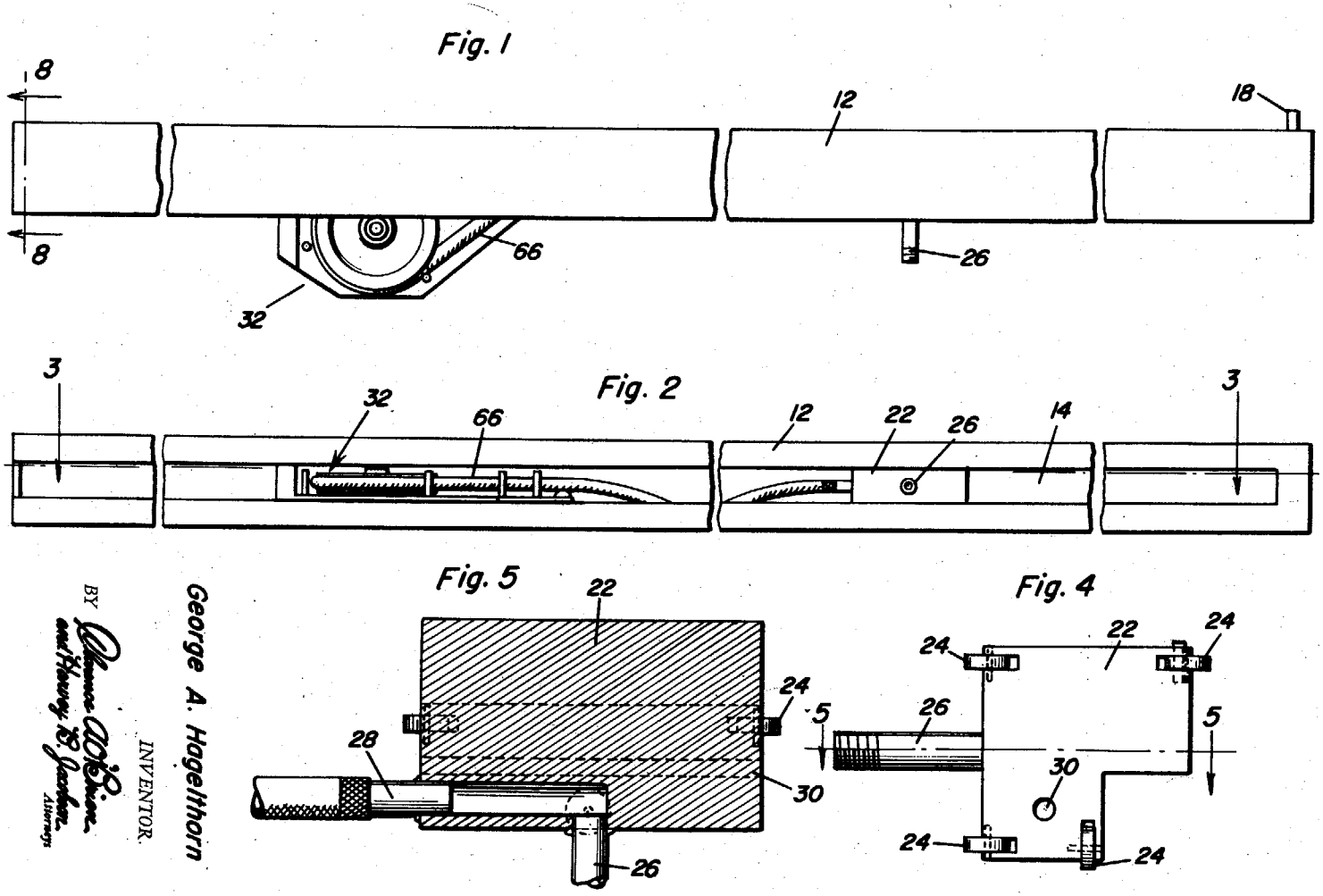
George A. Hagelthorn
INVENTOR.
BY Clarence A. O'Brien and Harvey B. Jacobson
Attorneys HOSE AND CONDUIT SYSTEM
Original Filed Feb. 17, 1959 2 Sheets-Sheet 2
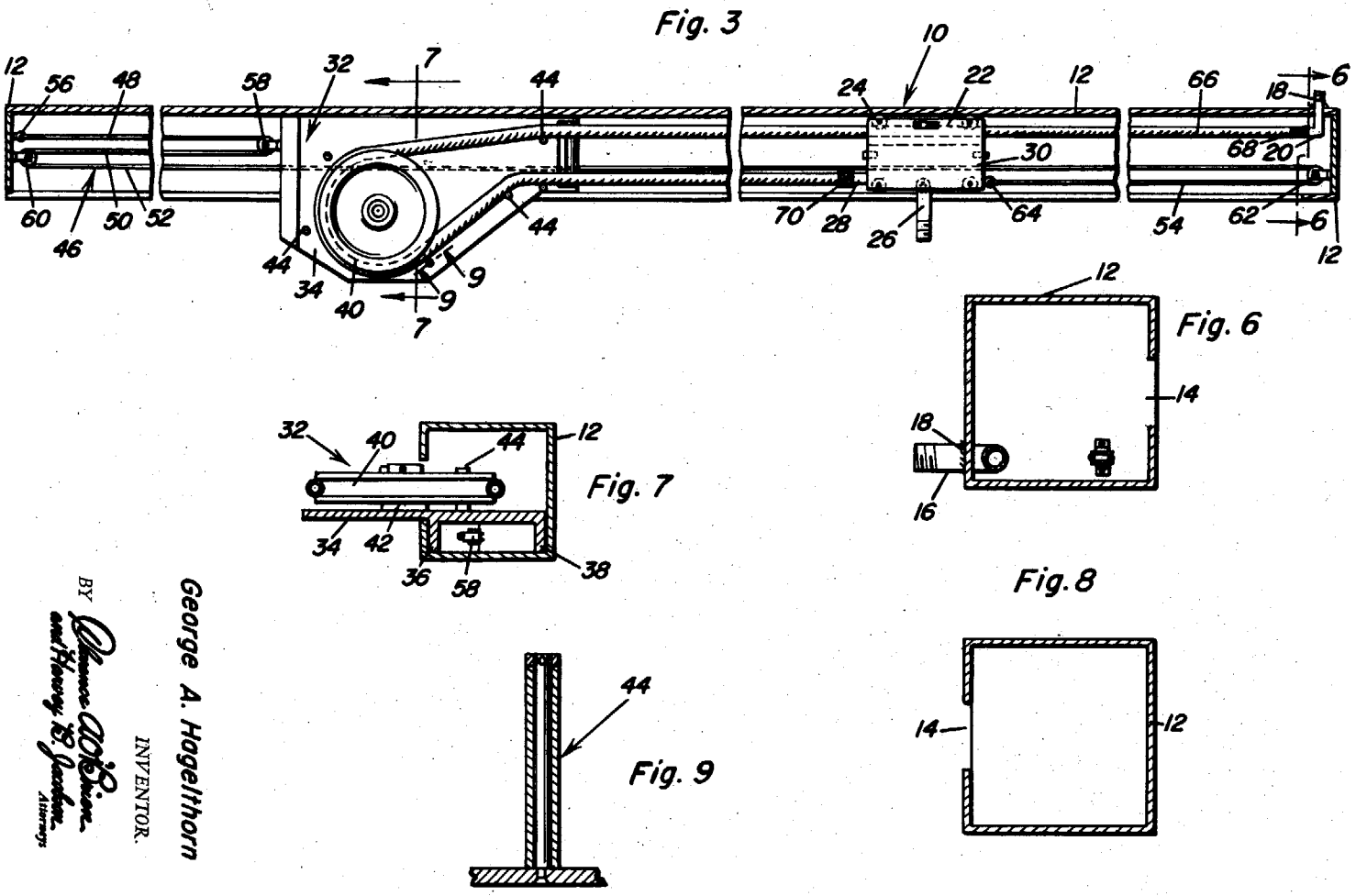
George A. Hagelthorn
INVENTOR.
BY Clarence A. O'Brien and Harvey B. Jacobson
Attorneys United States Patent Office Re. 25,642
Reissued Sept. 15, 1964

25,642
HOSE AND CONDUIT SYSTEM

George A. Hagelthorn, De Kalb County, Ga.
(2470 Wood Acres Road NE., Atlanta 6, Ga.)

Original No. 2,974,676, dated Mar. 14, 1961, Ser. No. 793,907, Feb. 17, 1959. Application for reissue Mar. 13, 1963, Ser. No. 265,019

14 Claims. (Cl. 137—343)

Matter enclosed in heavy brackets [ ] appears in the original patent but forms no part of this reissue specification; matter printed in italics indicates the additions made by reissue.

This invention relates generally to a system for controlling, conveying, and positioning a hose and discharge point thereof wherein the hose is maintained in a safe and orderly fashion.

In the utilization of pneumatic hose employed in conjunction with pneumatic equipment, the hose generally is suspended in a loop arrangement from an I beam so that the hose discharge point may be moved in accordance with the positioning of various air lifts. The loop arrangement presently employed is clumsy and cumbersome and it has been found that the hose does not follow the trolley. Further, the system is inadequate because it has proven to be unsafe in that the hose may be severed or it may break loose from a coupling whereby a dangerous instrument will be released as the hose whips through the air motivated by escaping conveyed compressed gas.

It is one of the primary objects of this invention to provide an orderly method of handling any fluid conveying flexible hose between the connection at the supply point and the connection at the discharge point where the equipment is being served.

It is a further object of this invention to so control the hose by confining the hose within a conduit system at all times during the operation.

Further, the invention provides means for positioning the hose within the conduit according to the location requirements of the equipment being served. The hose discharge point is free to move along the complete length of the conduit while the interior components within the conduit assure the orderly handling of the hose between the hose inlet and hose discharge point. The invention finds particular utility when employed for supplying compressed air to overhead air motor hoists and propulsion air motors. However, the teachings of this invention apply equally well to the control of any fluid conveying flexible hose.

A still further object of this invention is to provide a novel system wherein a hose length is confined within a conduit so as to remove unsightly exposed and disorderly loops of hose which are prone to catch and snag. It will be apparent that the conduit will provide a protective housing for the hose eliminating somewhat the corrosive effects of heat and fumes which may be present.

In accordance with the above stated objects, below is described the novel system for controlling the conveyance of a discharge point of a hose wherein the hose [wherein the hose] is maintained in a safe orderly fashion. The components of the system include the conduit, a length of flexible hose, a hose carrier, a hose guide, and a cable control system connecting the hose guide and hose carrier for maintaining desired relative positioning therebetween.

Other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational plan view of the conduit system comprising this invention;

FIGURE 2 is an elevational rear view of the system comprising this invention;

FIGURE 3 is a sectional view taken substantially along the plane 3—3 of FIGURE 2;

FIGURE 4 is an elevational end view of the hose carrier forming a component of the system of the invention;

FIGURE 5 is a sectional view taken substantially along the plane 5—5 of FIGURE 4;

FIGURE 6 is a sectional view taken substantially along the plane 6—6 of FIGURE 3;

FIGURE 7 is a sectional view taken substantially along the plane 7—7 of FIGURE 3;

FIGURE 8 is a sectional view taken substantially along the plane 8—8 of FIGURE 1; and FIGURE 9 is a sectional view taken substantially along the plane 9—9 of FIGURE 3.

With continuing reference to the drawings, numeral 10 generally represents the conduit system comprising this invention and including a substantially square conduit 12 having an elongated rear opening 14. It is contemplated that the conduit be manufactured of heavy gauge steel or extruded aluminum. However, the measurements of the conduit and particular material utilized would vary depending on the size of the hose employed in the particular sysem. Design requirements would dictate the particular dimensions and configurations of the conduit along with the various components utilized. Still further, the flexible hose employed herein is a conventional hose capable of conveying the pressurized fluids required. Standard hose fittings and couplings may be utilized without exception. A hose inlet pipe 16 is fixed as by welding as at 18 to the conduit 12 and terminates in an elbow portion as illustrated at 20.

An initial system component is illustrated in FIGURE 4 wherein the hose carrier 22 supporting a plurality of rotatable wheels 24 is shown carrying the hose discharge pipe 26 which communicates with a right angle pipe portion 28 to be utilized in a manner more specifically disclosed below. It is to be noted at this time that an aperture 30 runs through the length of the hose carrier 22. Particularly referring to FIGURE 3, it is noted that the hose carrier 22 is positioned within the conduit 12 whereby the various wheels 24 contact the conduit sides allowing the hose carrier 22 to move within the conduit. The discharge pipe 26 extends rearwardly through the elongated opening 14 in the conduit 12.

A second basic component of the system includes a hose guide 32 comprising a base member 34 having depending leg portions 36 and 38. The hose guide 32 is adapted to move along the conduit on sliding legs 36 and 38. Of course, any means may be utilized to provide a movable relationship between the conduit 12 and hose guide 32. For instance, wheels, as illustrated at 24 in connection with the hose carrier 22, may be employed. A pulley 40 is rotatably supported on vertical axis 42 mounted on base 34. The pulley 40 extends rearwardly from the conduit 12 through the elongated opening 14. A plurality of roller guides 44 are positioned on the base 34 for guidance purposes to be more clearly comprehended below.

A further basic component of the conduit system includes the cable control system which provides connection between the hose carrier 22 and the hose guide 32. The cable control system includes initially a cable 46 having sections 48, 50, 52, and 54. A hook 56 is secured to a portion of the conduit 12 and fastens one end of the cable 46 thereto. Section 48 of the cable 46 then proceeds around a pulley 58 carried by hose guide 32, through section 50 around a pulley 60 fixed to the conduit 12, through section 52 passing below the base 34 of hose guide 32 and through aperture 30 of hose carrier 22, around pulley 62 fixed to the conduit 12 at an end remote from the point where pulley 60 is fixed, through section 54 to hook 64 fixed to the hose carrier 22. The manner in which the control cable system operates will be more fully discussed below.

A flexible hose 66 is coupled to the hose inlet 16 in a conventional manner at 68. The hose 66 proceeds through the conduit around guide rollers 44 and around the pulley 40 of hose guide 32 and is coupled to the pipe section 28 at coupling 70.

*At least one of the guide rollers, such as the first roller marked 44 in FIG. 3 after the one with the section 9—9 line and in the direction of the hose carrier 30, provides a guide means exerting force on the hose 66 after the hose 66 is reversed in direction by a reversing means including a reversing hose guide pulley 40 (which reversed the hose 66 from the direction leading from the fixed inlet 16 through an arc of approximately 180 degrees). The guide means, roller 44, tends to force the hose 66 to remain on the reversing pulley 40 during the reversing motion thereon. The force exerted by the guide roller 44 against hose 66—or vice versa—opposes any tension in the hose (as would occur when air pressure is introduced into the hose 66) and directs and forces the hose 66 back in the direction from the inlet 16 that it came from, that is, back towards the length of hose extending from the hose inlet 16 to the reversing pulley 40. The distance between the two lengths of hose 66, one length extending from the hose inlet to the reversing means and other length from the hose reversing means pulley 40 to the hose carrier 22 is less at the hose guide means roller 44 than the maximum distance between the two lengths measured across the loop of hose 66 at the hose reversing means, across the diameter of pulley 40 in FIG. 3. This action helps maintain the hose 66 on the reversing pulley 40 and against the guide means, roller 44, and directs the hose in an orderly fashion back to the conduit 12 and maintains the hose 66 in a straighter fashion and manner than would occur with loose loops and lack of support and/or guidance.*

In the operation of this system, for instance when used in conjunction with an overhead air motor hoist on a monorail, the conduit is constructed so as to be equal in length to the service distance of the monorail. The conduit suspension is parallel to the monorail and is preferably supported from brackets as by welding. When attaching the discharge point 26 of the system to the service inlet of a hoist being served, a standard flexible hose of a proper length to provide a loop between the conduit discharge and service inlet is utilized. In order to prevent any force from being transmitted along this connecting hose, a cable or chain of shorter length than the connecting hose is utilized between the service inlet and the hose carrier 22. It will be apparent that since the cable or chain is of shorter length than the connecting hose, it will transmit any force induced by any relative movement by the service inlet to the hose carrier and no force will be transmitted through the connecting hose. Referring to FIGURE 3, assuming that a force to the right is transmitted to the hose carrier 22. The force will be transmitted from the hose carrier 22 along the hose 66 to the pulley 40 and axis 42 thereof. As the hose carrier 22 moves a particular distance to the right, the hose guide 32 will move half that distance to the right. Of course, as hose carrier 22 moves to the right the hook 64 attached thereto moves to the right and cable will pass through pulley 62 and pulley 60 to compensate for pulley 58 moving to the right. It should be apparent that therefore as the hose discharge point 26 moves to the right, the hose length 66 will be maintained in a safe orderly fashion about the pulley 40 and the hose 66 will not tend to loop, gather, or bunch to impede movement. If now, a force is transmitted to the hose carrier 22 such that the hose discharge point 26 must move to the left, a force will be transmitted through section 54 of cable 46. The force transmitted through the cable 46 will pull the pulley 58 to the left and thereby of course carry the hose guide 32 to the left. Again, it will be apparent that the hose length 66 will remain in orderly fashion. It should further be apparent that the hose guide 32 moves half the distance of the hose carrier 22 in either direction. It should be apparent therefore that herein has been disclosed a novel system for controlling the conveyance of a discharge point of a hose whereby the hose is maintained in a safe orderly fashion. Further, one skilled in the art should realize that the hose is maintained in a safer more operative condition thereby minimizing expense and improving safety conditions.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

I claim:

1. A novel system for controlling the conveyance of a discharge point of a hose wherein the hose is maintained in a safe orderly fashion comprising a conduit having [a rectangular cross-section], *an opening along the length thereof,* a hose [carrier] *guide* in said conduit including a base member [, a pair of legs projecting laterally from said base member and slidably engaged] *having at least part thereof mounted for movement* in said conduit, a hose [guide] *carrier* in said conduit movable with respect thereto, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys respectively, said cable secured at a second end to said hose carrier, a hose inlet supported by said conduit, a fixed length of hose in said conduit, said hose fixed at one end to said hose inlet, said hose fixed at a second end to said hose carrier, said hose guide [including] *having a hose reversing means including a hose guide* pulley, said hose being looped around said pulley *and being reversed on said reversing means,* guide *means* [rollers] supported [in] *on* said conduit adjacent *to and spaced from* said hose guide pulley *in the direction of said hose carrier* for maintaining said hose on said hose guide pulley, [rotatable wheels carried by] *means attached to* said hose carrier and [engaged with] *retaining same on* said conduit for facilitating movement of said hose carrier, *the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reevrsing means to the hose carrier, less at the hose guide means than the maximum distance between the two lengths measured across the loop of hose at the hose guide reversing means.*

2. A novel system for controlling the conveyance of a discharge point of a hose wherein the hose is maintained in a safe orderly fashion comprising a conduit having a rectangular cross-section, a hose carrier in said conduit movable with respect thereto, a hose guide in said conduit including a base member, a pair of legs projecting laterally from said base member and slidably engaged in said conduit, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys respectively, said cable secured at a second end to said hose carrier, a hose inlet supported by said conduit, a fixed length of hose in said conduit, said hose fixed at one end to said hose inlet, said hose fixed at a second end to said hose carrier, said hose guide including a pulley, said hose being looped around said pulley, guide rollers supported in said conduit adjacent said hose guide pulley for maintaining said hose on said hose guide pulley, rotatable wheels carried by said hose carrier and engaged with said conduit for facilitating movement of said hose carrier, said hose carrier including said hose discharge point.

3. A novel system for controlling the conveyance of a discharge point of a hose wherein the hose is maintained in a safe orderly fashion comprising a conduit, a hose carrier in said conduit movable with respect thereto, a hose guide in said conduit movable with respect thereto, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys respectively, said cable secured at a second end to said hose carrier, a hose inlet supported by said conduit, a fixed length of hose in said conduit, said hose fixed at one end to said hose inlet, said hose fixed at a second end to said hose carrier, said hose guide including a pulley, said hose being looped around said pulley, guide rollers supported in said conduit adjacent said hose guide pulley for maintaining said hose on said hose guide pulley, rotatable wheels carried by said hose carrier and engaged with said conduit for facilitating movement of said hose carrier, said hose carrier including said hose discharge point, said conduit having an elongated opening, said opening accommodating said hose discharge point, said conduit being rectangular in cross-section, said hose guide including a base member upon which said hose guide pulley is supported, and a pair of legs projecting laterally from said base member and slidably engaged with said conduit.

*4. In a system for controlling the conveyance of a discharge point of a hose wherein the hose is maintained in a safe orderly fashion comprising a conduit, a hose guide in said conduit including a base member, means on said base member movably mounted on said conduit, a hose carrier in said conduit movable with respect thereto, means connecting said hose guide to said hose carrier for relating their respective movements, said means including a cable control system, said cable control system including a first pulley, a second pulley, a third pulley, said first pulley secured to said hose guide, said second pulley secured to said conduit, said third pulley secured to said conduit, a cable secured at one end to said conduit, said cable passing around said first, second and third pulleys respectively, said cable secured at a second end to said hose carrier, a hose inlet supported by said conduit, a fixed length of hose in said conduit, said hose fixed at one end to said hose inlet, said hose fixed at a second end to said hose carrier, said hose guide having a hose reversing means including a hose guide pulley and a hose guide means adjacent to and spaced therefrom, said hose being looped around said hose guide pulley in a direction from the inlet end of said hose and thence between said guide pulley and said hose guide means and around at least a portion of said second hose guide means adjacent the conduit, said conduit having a hose opening formed therein along the length thereof, said hose carrier being mounted for movement in said conduit opening along the length thereof and adapted to travel with the outlet of said hose, the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reversing means to the hose carrier, less at the hose guide means than the maximum distance between the two lengths measured across the loop of hose at the hose guide reversing means.*

*5. A novel system for controlling the conveyance of a discharge point of a hose wherein the hose is maintained in a safe orderly fashion comprising a conduit having an elongated opening along substantially all of the operable length thereof, and said opening constituting a slot in which one end connection of said hose is adapted to operate along the length of said conduit, a hose carrier in said conduit in said slot and supported by means carried with said carrier for guiding said carrier in said conduit slot for facilitating movement of said carrier, a hose guide in said conduit movable with respect thereto, means connecting said hose guide to said hose carrier for relating their respective movements, said means including a cable and pulleys arranged to drive said hose guide as said hose carrier is moved in said conduit, a hose inlet supported by said conduit, a fixed length of hose in said conduit, said hose fixed at one end to said hose inlet inside said conduit, said hose fixed at a second end to said hose carrier, said hose guide having a hose reversing means including a hose guide pulley and said hose being looped around said pulley leading from the fixed end on said conduit around said pulley and thence beneath a hose guide means supported on said hose guide and spaced from said pulley, said hose being guided from said pulley beneath said hose guide means, and thence to said hose carrier, the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reversing means to the hose carrier, less at the hose guide means than the maximum distance between the two lengths measured across the loop of hose at the hose guide reversing means.*

*6. A novel system for controlling the conveyance of a discharge point of a hose wherein the hose is maintained in a safe orderly fashion comprising a conduit having a hose passage along the length thereof, a hose carrier on said conduit member, a hose guide on said conduit movable with respect thereto, means connecting said hose guide to said hose carrier for relating their respective movements, said means including a cable control system, said cable control system including at least one pulley, and a cable, said cable and said pulley arranged so that movement of said hose carrier also moves said hose guide, a hose inlet supported by said conduit, a fixed length of hose in said conduit, said hose fixed at one end to said hose inlet inside said conduit, said hose fixed at a second end to said hose carrier, said hose guide having a hose reversing means including a hose guide pulley having a portion thereof inside said conduit through said passage, said hose extending from said inlet end and being looped around said pulley, hose guide means carried by the hose guide adjacent to and spaced from said pulley and said*

*hose extending from inside said conduit around said pulley between said pulley and said hose guide means and thence along said conduit to said hose carrier, there being an inner and outer hose length substantially parallel at all times, except adjacent the hose guide means, the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reversing means to the hose carrier, less at the hose guide means than the maximum distance between the two lengths measured across the loop of hose at the hose guide reversing means.*

*7. A novel system for controlling the conveyance of a discharge point of a hose wherein the hose is maintained in a safe orderly fashion comprising a conduit having a hose passage along the length thereof, a hose carrier mounted for travel on said conduit along said passage, a hose guide on said conduit movable with respect thereto, means connecting said hose guide to said hose carrier for relating their respective movements, said means including a cable control system, said cable control system including a pulley and cable arranged so that movement of said hose carrier also moves said hose guide, a hose inlet supported by said conduit, a fixed length of hose in said conduit, said hose fixed at one end to said hose inlet inside said conduit, said hose fixed at a second end to said hose carrier, said hose guide having a hose reversing means including a hose guide pulley, said hose extending from said inlet and being looped around said pulley, hose guide means supported adjacent to and spaced from said hose guide pulley for maintaining said hose on said hose guide pulley, said hose leading from the loop around said pulley between said guide means and said pulley and leading to said hose carrier, whereby in travel of said hose carrier part of the hose length is laid out inside said conduit along the length thereof and part is laid out along said conduit substantially parallel to said other part, the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reversing means to the hose carrier, less at the hose guide means than the maximum distance between the two lengths measured across the loop of hose at the hose guide reversing means.*

*8. In a novel system for controlling the conveyance of a discharge point of a hose wherein the hose is maintained in a safe orderly fashion comprising a conduit having an opening along the length thereof, a hose carrier in said conduit mounted for movement on said conduit, a hose guide on said conduit movable with respect thereto, means connecting said hose guide to said hose carrier for relating their respective movements, said means including a cable control system, said cable control system including a pulley and a cable and said system causing said hose guide to move in response to the movement of said hose carrier, a hose inlet supported by said conduit, a fixed length of hose in said conduit, said hose fixed at one end to said hose inlet inside said conduit, said hose fixed at a second end to said hose carrier, said hose guide having a hose reversing means including a hose guide pulley having the axis thereof perpendicular to said longitudinal center line of said conduit, said hose being looped around said pulley extending from the inside and thence in the opposite direction, hose guide means on said conduit adjacent to and spaced from said hose guide pulley for maintaining said hose on said hose guide pulley, means attached to said hose carrier and retaining same on said conduit for facilitating movement of said hose carrier, said hose extending from said hose inlet along the inside of said conduit thence around said pulley thence out of said conduit opening between said pulley and said guide means and thence to said hose carrier, there being a length of hose maintained in the conduit as said hose guide and hose carrier move along said conduit and another length of hose extending in the opposite direction substantially parallel to said inner length, said inner hose length being maintained in said conduit by said pulley whenever said hose carrier travels and regardless of the direction along the conduit, the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reversing means to the hose carrier, less at the hose guide means than the maximum distance between the two lengths measured across the loop of hose at the hose guide reversing means.*

*9. The device in claim 8 wherein said outer length of hose between the hose carrier and hose guide is fed by said hose guide pulley into the opening in said conduit.*

*10. The device in claim 9 wherein said hose guide pulley has a portion thereof inside said conduit and extending through the opening which extends along the length of said conduit.*

*11. In a system for controlling the conveyance of a discharge point of a hose wherein the hose is maintained in a safe orderly fashion comprising, a conduit having an elongated opening along substantially all of the operable length thereof, and said opening constituting a slot in which one end connection of said hose is adapted to operate along the length of said conduit, a hose carrier in said conduit supported for movement in said slot by means carried with said carrier for guiding said carrier for facilitating the movement thereof, a hose guide in said conduit movable with respect thereto, means connecting said hose guide to said hose carrier for relating their respective movements, said means including a means arranged to drive said hose guide as said hose carrier is moved in said conduit, a hose inlet supported by said conduit, said hose fixed at one end to said hose inlet and inside of said conduit, said hose fixed at a second end to said hose carrier, said hose guide having a reversing means including a hose guide pulley and said hose being at all times looped about said pulley leading from the fixed end thereof inside said conduit and around said pulley and thence being guided by, a hose guide means adjacent to and spaced from and cooperating with said pulley to guide said hose which leads from the loop thereof off said pulley back in the direction of said conduit and slot therein and to said hose carrier to which said other end is secured, said hose being in one direction of movement of said carrier extended along the inside of said conduit in a neat, substantially straight fashion as said carrier moves, and there also being a portion of said hose substantially parallel with the portion inside said conduit directed by said hose guide means from said pulley back to said hose carrier, the location of said hose guide means being such with respect to the hose reversing means as to direct the hose leading from the hose reversing means to the hose carrier, back in the direction of the hose leading to the hose reversing means from the hose inlet and to make the distance between the two lengths of hose, one length extending from the hose inlet to the hose reversing means and the other length from the hose reversing means to the hose carrier, less at the hose guide means than the maximum distance between the two lengths measured across the loop of hose at the hose guide reversing means.*

*12. The device in claim 11 wherein, when said conduit is mounted horizontally and said slot is facing outwardly, the periphery of the pulley is facing said slot so that said*

*pulley is feeding the hose out of said slot and into said slot depending upon the direction of movement of the carrier and pulley.*

*13. The device in claim 12 wherein said pulley has a portion thereof travelling in the slot inside the conduit.*

*14. The device in claim 12 wherein the plane of the pulley as defined by the center thereof and the middle of the periphery passes through at least part of said slot and a line straight along the length of said slot and the length of hose fed from the inside around the pulley in one direction as said pulley moves toward the fixed inlet of the hose travels along the length of the slot guided to the hose carrier by the guide means and when the pulley moves in the opposite direction the length is guided neatly into the conduit between the back of the conduit and the periphery of the pulley.*

References Cited in the file of this patent or the original patent

UNITED STATES PATENTS

| | | |
|---|---|---|
| 467,746 | Brown | Jan. 26, 1892 |
| 2,395,485 | Jones | Feb. 22, 1946 |
| 2,730,183 | Svoboda | Jan. 10, 1956 |
| 2,799,186 | Siekmann | July 16, 1957 |
| 2,892,389 | Schurger | June 30, 1959 |
| 2,926,689 | Berry | Mar. 1, 1960 |
| 2,935,080 | Klimek | May 3, 1960 |

FOREIGN PATENTS

| | | |
|---|---|---|
| 511,329 | Belgium | May 31, 1952 |